United States Patent [19]
De Bell et al.

[11] 3,780,231
[45] Dec. 18, 1973

[54] RECORDER HAVING MANUALLY ACTUATED MEANS FOR PIVOTAL VERTICAL MOVEMENT OF THE HEAD INTO OPERATING POSITION

[75] Inventors: Lawrence R. De Bell, Bethany; David D. Price, Jr., Oklahoma City, both of Okla.

[73] Assignee: Economy Co., Oklahoma City, Okla.

[22] Filed: Mar. 31, 1972

[21] Appl. No.: 239,944

[52] U.S. Cl. ........................ 179/100.2 CA, 274/4 A
[51] Int. Cl. ........................ G11b 21/02, G11b 5/54
[58] Field of Search ........ 179/100.2 CA, 100.2 MD, 179/100.2 Z; 274/4 A, 4 B, 4 C, 11 A, 11 B, 274/11 C

[56] References Cited

UNITED STATES PATENTS

| | | | |
|---|---|---|---|
| 3,420,965 | 1/1969 | Townsend et al. | 179/100.2 Z |
| 3,560,666 | 2/1971 | Bookman | 179/100.2 Z |
| 3,644,684 | 2/1972 | Tsuji | 179/100.2 Z |
| 3,586,336 | 6/1971 | Rosenblatt | 179/100.2 Z |

FOREIGN PATENTS OR APPLICATIONS

| | | | |
|---|---|---|---|
| 93,766 | 4/1959 | Norway | 179/100.2 CA |

*Primary Examiner*—Terrell W. Fears
*Assistant Examiner*—Robert S. Tupper
*Attorney*—Jerry J. Dunlap et al.

[57] ABSTRACT

A tape transport device, particularly adapted for usage of standard-sized cassettes, that has an improved drive system and control system which contributes to higher reliability as well as economy of manufacture. The tape transport device includes a three motor drive system operating in conjunction with a lever-actuated control bar carrying both the reproducing transducer and capstan idler, and which may also carry a recording head for special designed usages. Control actuation members function in integral interaction with a printed circuit assembly which forms the underclosure of the transport device and imparts advantageous mechanical and electrical circuit characteristics to the device.

11 Claims, 8 Drawing Figures

RECORDER HAVING MANUALLY ACTUATED MEANS FOR PIVOTAL VERTICAL MOVEMENT OF THE HEAD INTO OPERATING POSITION

BACKGROUND OF THE INVENTION

1. Field of the Invention

The present invention relates to tape transport devices and, more particularly, but not by way of limitation, the invention relates to cassette recording and reproducing devices of low-cost type having improved actuation mechanism and control components.

2. The Prior Art

The prior art includes many and varied forms of reproducing device constructed generally along the lines requiring economy of construction and the capability to reproduce standardized containers of endless magnetic tape. Such prior art devices have generally required the extensive usage of complicated and sometimes frail slide actuation mechanisms serially interactive to engage a plurality of operating levers, springs and/or pawl assemblies. In addition, prior drive systems have adhered to the single motor concepts deriving from the previous design and operational art, and such systems, while being economical with respect to cassette player construction, are unable to contribute a high degree of tape drive precision and reliability of operation.

SUMMARY OF THE INVENTION

The present invention relates to an improved transport device which includes integral construction of control actuation and printed circuit components operating in conjunction with a plural motor drive system. More particularly, the invention relates to a transport utilizing three drive motors for control of standard tape cassettes having plural channel capability, and including a lever-operated control bar carrying reproducing head and tensioning components as operated in response to front panel mechanical actuation. The invention achieves greater reliability and economy of construction through particular printed circuit board construction which is adapted for both inherent functions and mechanical functions as the circuit board serves as an interactive component with the energization and control operating elements of the device.

Therefore, it is an object of the present invention to provide an improved tape transport device having higher reliability and greater tape drive precision while being of more simple and less expensive nature.

It is also an object of the present invention to provide a transport device having more reliable and long lasting mechanical actuation components.

It is yet another object of this invention to provide a device having increased tape drive precision and more constant drive speed.

It is yet another object of the present invention to provide a high reliability device which is relatively more economic in manufacture.

Finally, it is an object of the invention to provide improvements in construction and operation of tape cassette recorder/reproducers.

Other objects of the invention will be evident upon consideration of the detailed description of the invention when read in conjunction with the drawings illustrating the invention.

DETAILED DESCRIPTION OF THE INVENTION

Figure 1:
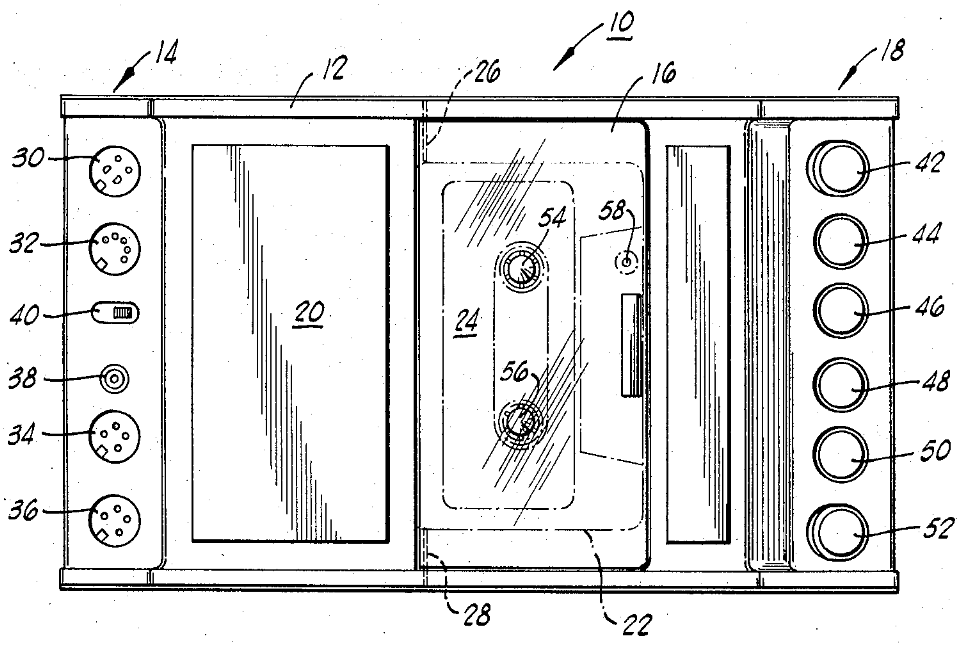
FIG. 1 is a top plan view of the tape transport device of the invention.
Figure 3:
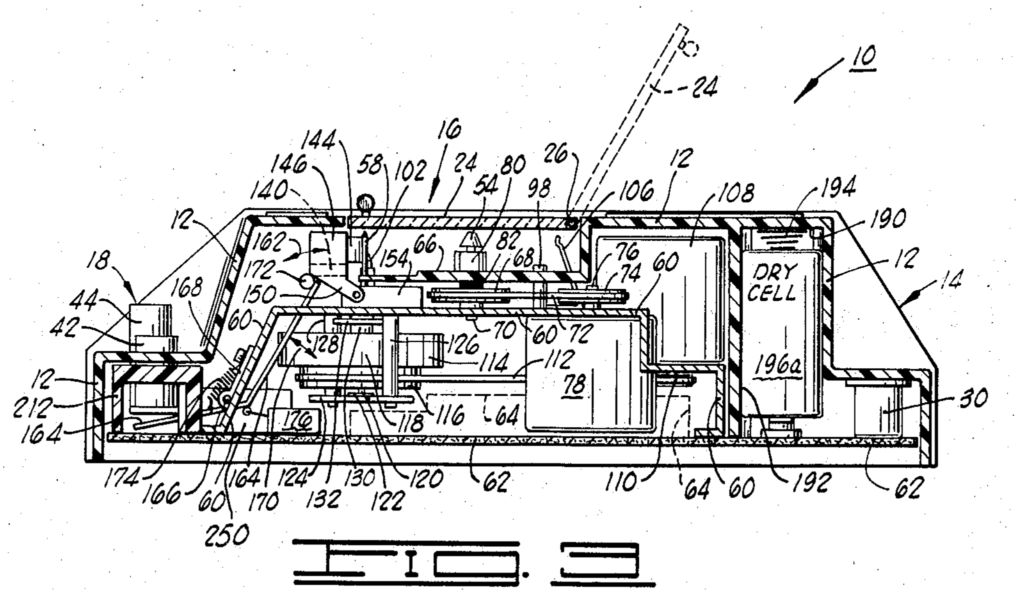
FIG. 3 is the side elevational view of the tape transport device with the cover panel side shown cut away.

FIG. 1 illustrates in top view a tape transport 10 comprised of a cover panel 12, a unitarily molded cover assembly (see also FIG. 3). Cover panel 12 provides a receptacle access area 14, a tape access area 16 and a control access area 18, as well as a panel area 20 which may be utilized for operational instructions, trademarks and/or trade names, etc.

The tape access area 16 is shown as including a standard tape cassette 22 in operative position beneath a hinged cover panel 24, which may be constructed from suitable transparent or semi-transparent material, as rotatably secured by means of hinge pins 26 and 28 secured within the sides of cover panel 12.

The receptacle access area 14 includes access to each of receptacles 30, 32, 34 and 36, multi-pin receptacles, as well as a two-conductor jack receptacle 38 and a two-position switch 40. The multi-pin receptacles 30-36 are utilized in various connections peculiar to operation as a tutoring machine, as will be further described below, while jack receptacle 38 provides an input for battery charging and two-position switch 40 may be utilized to provide record/reproduce or local/-remote control, depending upon particular application of the unit and the exigencies attending such application.

The control access area 18 provides a plurality of push buttons for controlling the various operations of the tape transport pin. A push button 42 provides tape transport "Play" function, while remaining control buttons 44, 46, 48, 50 and 52 provide functions of "Fast Forward", "Volume control", "Restart", "Rewind", and "Repeat".

FIG. 1 shows a standard-type tape cassette 22 in operative engagement within tape access area 16 and beneath the closed access door 24. Thus, tape cassette 22 is in position with reel drive spurs 54 and 56 engaged therewith and tape drive capstan 58 properly inserted through its access hole and adjacent the record tape. Such arrangement for spur and capstan engagement is standard and is provided for in all standard types of magnetic tape cassettes.

Figure 2:
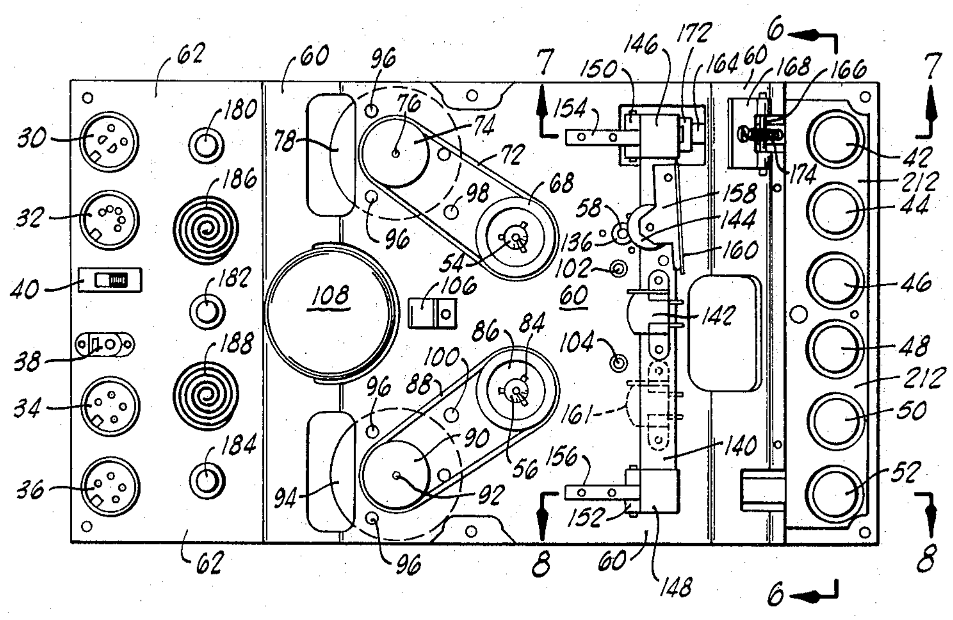
FIG. 2 is a top plan view of the tape transport chassis with cover panel removed.

With further reference to FIGS. 2 and 3, a transport chassis 60 provides primary support for the various mechanical components of tape transport 10. A printed circuit board 62 serves as conductor and circuit foundation for tape transport device 10. Thus, printed circuit board 62 includes phot-etched conductor configuration (not specifically shown herein) as well as providing a support base for receptacles 30, 32, 38, 34 and 36 and two-position switch 40, and it further includes various push button switch components for interaction with push buttons 42–52, as will be further described. Actual transistor or integrated circuit components may be permanently mounted on printed circuit board 62 to extend within the space outlined generally by dash-lines 64 (FIG. 3). Specific circuitry essentially suitable for control and function with the present invention is set forth in the inventor's prior U. S. Pat. No. 3,594,919 entitled "Improvements in Tutoring Devices".

The tape drive spur 54 is securely affixed to extend upward through a tape access panel 66 (FIG. 3), an integral portion of cover panel 12, from a drive pulley 68 which is suitably rotatably affixed to transport chassis 60 by means of a securing pin 70 or the like. Drive pulley 68 is then inter-connected by means of a rubber drive belt 72 to a motor pulley 74 affixed to drive shaft 76 of a take-up drive motor 78. Drive spur 54 includes a vertically movable key ring 80 of conventional type as supported upon a spring 82, the assembly finding ample clearance through access panel 66.

The tape supply spur 56 is similarly constructed with a spring loaded key ring 84 and lower axial extension finding positive connection to a supply drive pulley 86 for rotation on a suitable post (not shown), similar to post 70, as suitably affixed through chassis 60 as by force-fit or suitable fastener. The drive pulley 86 is driven by a rubber drive belt 88 which is also engaged with a drive pulley 90 secured to drive shaft 92 of a tape supply motor 94. Each of take-up motor 78 and supply motor 94 may be any of various commercially available small or fractional horse power motors; however, present prototypes utilize a model MAG–5SD7N, 5 through 8.5 volts d.c. motor, as manufactured by Matsushita Industrial Electric Company Limited. Each of motors 78 and 94 are secured to the underside of the chassis 60 by means of suitable fasteners 96.

A pair of cassette seating posts 98 and 100 are secured to a chassis 60 by force-fit, screw fastening or the like. Seating posts 98 and 100 extend upward through access panel 66 and provide horizontal seating surfaces to support each corner of the cassette when in operative engagement. Similarly, to support the forward end of the inserted cassettes, a pair of guide-seating posts 102 and 104 are similarly secured to the upper surface of chassis 60. Guide-seating posts 102 and 104 are formed with an uppermost pointed end for entry into the conventional and standardized guide holes within the tape cassettes, and a shoulder portion which serves to bear against the lower surface of the cassette in supporting manner when the cassette is in operative position. A leaf spring 106 is secured on the upper surface of chassis 60 extending up through access panel 66 of cover panel 12, and serves to clamp and hold the cassette in place when operational.

Referring to FIG. 3, the capstan drive to capstan 58 is derived from a capstan drive motor 108 mounted centrally on the upper side of chassis 60. Drive motor 108 may be of the same electrical rating as drive motors 78 and 94. Drive motor 108 provides direct rotational drive to a drive pulley 110 which rotates a rubber drive belt 112 to impart rotation to a capstan drive pulley 114. The capstan drive pulley 114 is formed as a combination pulley and inertial device, having a first smaller diameter pulley portion 116 receiving drive belt 112 and having a diameter consonant with proper drive speed requirements. Capstan drive pulley 114 also includes a larger diameter portion 118 which provides desired angular momentum to the capstan drive system.

Figure 4:
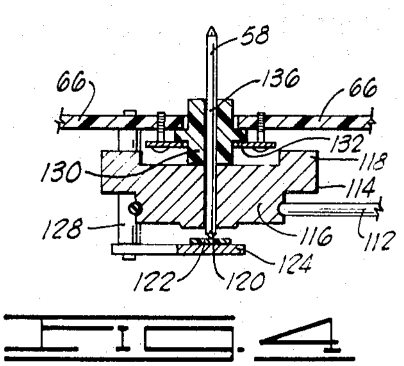
FIG. 4 is an inverted Section as taken along lines 4—4 of FIG. 5.

Referring also to FIG. 4, a bearing end 120 is secured to extend from the axis of capstan drive pulley 114. Bearing end 120 rests vertically against a suitable bearing material 122 as secured on a cross plate 124 which, in turn, is maintained in secure position by means of support posts 126 and 128 affixed to the underside of chassis 60. The capstan drive pulley 114 extends an axial bushing 130 through the chassis 60 as secured by a collar element 132. A shaft 136, constituting the capstan 58 at its upper end and the bearing end 120 at its lower end, is secured to capstan drive pulley 114, as by force-fit, and is rotatably disposed upward along the central axis of bushing element 130.

A control bar 140 (FIGS. 2 and 3), which is vertically movable about a horizontal axis, controls positioning of a reproducing head 142, e.g. a four channel playback head of well-known and commercially available type, as well as tensioned positioning of a capstan idler pulley 144. Control bar 140 is supported at each end by end blocks 146 and 148 which are pivotally attached at bifurcated end stubs 150 and 152, respectively, to suitable mounting blocks 154 and 156 as secured to the upper surface of chassis 60 at opposite sides thereof. The capstan idler 144 is rotatably secured within a yoke 158 which is secured to a leaf spring 160 suitably affixed to end block 146. The operative position of control bar 140 will maintain spring tension of idler capstan 144 against the tape record and capstan 58. A record head 161 may be utilized when secured to control bar 140 as shown, this alternative is particularly important relative to tutoring.

Upward rotation of control bar 140 into operative position (i.e. the traverse indicated by arrow 162) is effected by depression of push button 42 and movement of control lever 164. Control lever 164 is rotatably held by a pin 166 and fulcrum plate 168 secured to chassis 60, so that depression of push button 42 causes movement of control lever 164 through traverse indicated by arrow 170. Through such traverse, bearing bar 172 on the upper end of control lever 164 urges control bar 140 upward and into operative position engaging capstan 58 in the tape cassette. Push button 42 locks downward, as will be described. A spring 174 urges retraction of control lever 164 upon release of push button 42. A normally closed microswitch 176 suitably secured on printed circuit board 62 is similarly activated upon upward movement of bearing bar 172 and control bar 140 such that it closes to apply drive power to the capstan drive motor 108.

The printed circuit board 62 is formed to include all photo-etched conductive paths as well as specific component affixtures. Thus, each of receptacles 30, 32, 34 and 36, as well as jack receptacle 38 and switch 40 are preassembled in solder connection to the circuit board 62. In addition, a plurality of battery anode terminals 180, 182 and 184 (FIG. 2) are formed integrally on printed circuit board 62, while intermediately positioned negative dry cell contacting springs 186 and 188 are secured thereto. In complementary fashion, and referring to FIG. 3, a transverse compartment 190, formed with addition of a transverse wall 192 within cover panel 12, provides five oppositely oriented contacts, shown generally by a single spring 194, such that five dry cells 196 *a–e* may be contained therein to supply unit power.

Figure 5:
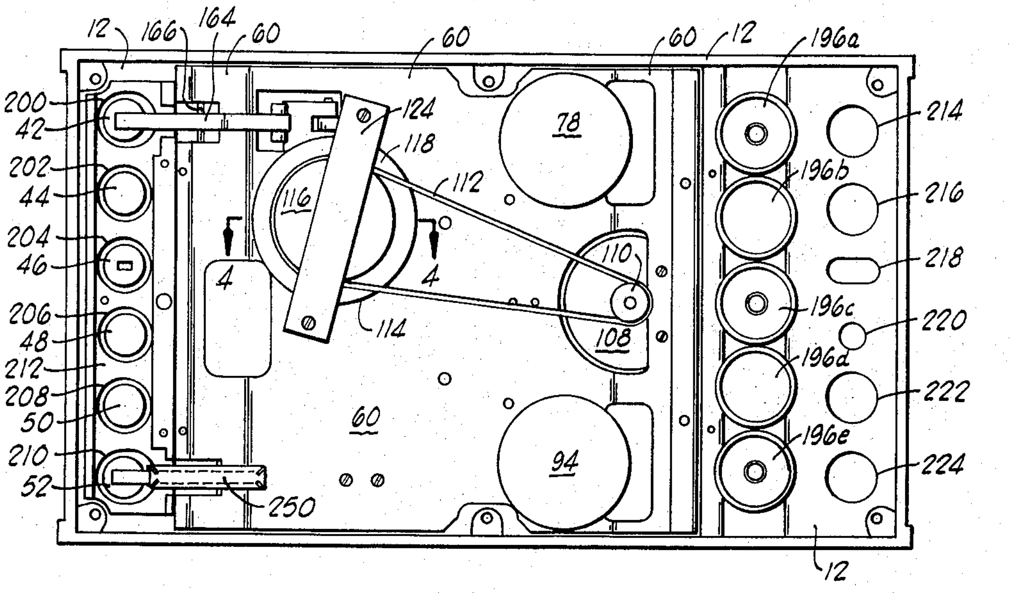
FIG. 5 is a bottom plan view of the tape transport chassis with printed circuit under closure removed.

FIG. 5 illustrates a bottom view of the chassis 60 with printed circuit board 62 removed but having cover panel 12 contained thereon. Each of push buttons 42 is contained in captive, reciprocating disposition within a respective cylindrical aperture 200, 202, 204, 206, 208 and 210, as formed through a U-shaped switch support member 212. The switch support member 212 (see also FIG. 3) may be formed from suitable fiber or plastic substance similar to cover panel 12, and may be permanently secured by suitable means to circuit board 62 to maintain push buttons 42–52 in operative position over the respective interactive components which are permanently, electrically connected into circuit board 62, as will be further described below. With further reference to FIG. 5, access appertures 214, 216, 218, 220, 222 and 224 are formed in the opposite end of cover panel 12 and, when circuit board 62 is placed in assembled position, they provide access holes for respective receptacles 30–34, audio jack receptacle 38 and two-position switch 40.

Figure 7:
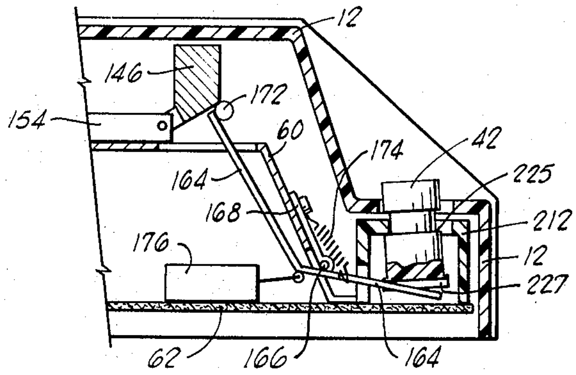
FIG. 7 is a sectional view taken along lines 7—7 of FIG. 2.
Figure 6:
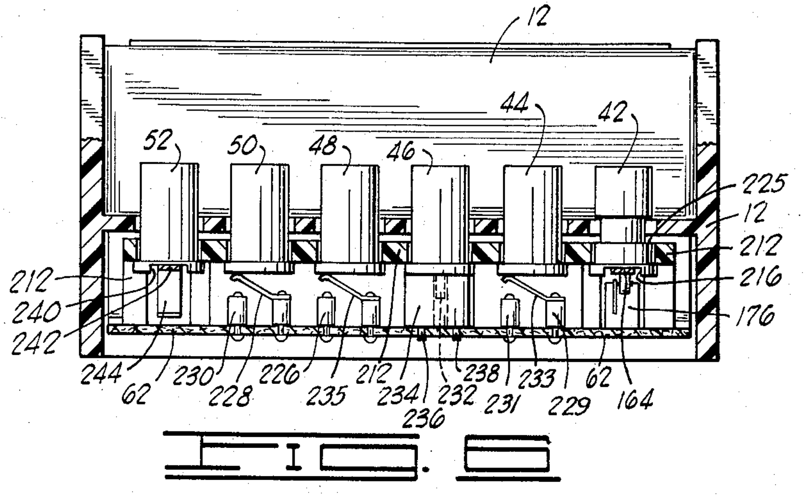
FIG. 6 is a sectional view taken along lines 6—6 of FIG. 2.

FIG. 6 illustrates in section the manner in which push buttons 42–52 are maintained in inter-active engagement relative to circuit board 62 and operational components. Push button 42, the PLAY push button may be pushed down and pressed forward for locking engagement wherein the lower shoulder of annular groove 225 is locked beneath the lower edge of support member 212, as shown more particularly in FIG. 7. The lower end of push button 42 includes an elongated groove 227 receiving actuation lever 164 therethrough, and depression of push button 42 moves actuation lever 164 such that control bar 140 is moved into operational position, as described above. Also, at the operational or upward extreme of actuating lever 164, the microswitch 176 is placed in the closed or energized condition.

Push button 44 is a push button switch closure which is utilized for FAST FORWARD control. The actual switch member consists of contacts 229 and 231 formed integrally with printed circuit board 62, contact 218 having a leaf spring contact 233 secured thereto. Push button actuation of push button 44 closes leaf spring 233 on contact 231, momentarily as held, and the spring force of leaf contact 233 is sufficient to bring the push button 44 back to its normal position. Similar types of operation are enabled by depression of push buttons 48 and 50. Push button 48 being coactive with a leaf spring contact 235 and contact 226, while push button 50 is coactive with a leaf spring contact 228 and a contact 230. Button 46 is the volume control button and it includes a key extension 232 extendind axially from the lower end thereof. Key extension 232 is of proper shape for mating engagement with a potentiometer 234, e.g. a mallory model MTZ end-adjust potentiometer, having its output leads 236 and 238 permanently affixed in contacting engagement within circuit board 62.

Figure 8:
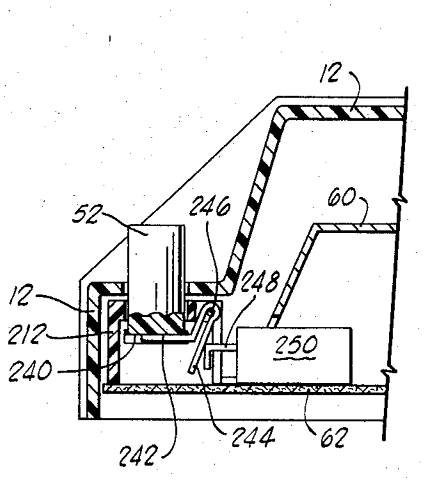
FIG. 8 is a sectional view taken along lines 8—8 of FIG. 2.

Finally, push button 52, the REPEAT push button, is utilized to provide mechanical actuation of a plural position switch. As shown in FIG. 8, push button 52 includes an elongated groove 240 for mating engagement with a crank arm portion 242 of a lever 244, said crank arm 242 being secured for pivotal movement about a pin 246 suitably disposed within support member 212. Depression of push button 52 moves lever 244 to urge a switch arm 248 inward (horizontally) in such manner as to switch contacts within a plural contact switch 250. In present prototypes, switch 250 is a two-position four-pole switch utilized in the REPEAT operation. Plural contact switch 250 is a commercially available form of switch which includes means for spring loaded return of switch actuation arm 248, thus to bring push button 252 back to its normal or upward position.

Operation

Description of the operation proceeds with respect to the several figures as noted. As shown in FIG. 1, the cassette 22 is placed in operation by lifting the access door 16 and inserting cassette 22 therewithin in mating engagement with drive spurs 54 and 56. The standard guide holes through the bottom of cassette 24 will properly seat down upon seating posts 98 and 100 and seat-guide posts 102 and 104 (FIG. 2). Depression of the PLAY push button 42 urges control lever 164 upward to move control bar 140 into its vertically upright position (See FIG. 3). Whereupon reproduce head 142 is brought into contact with the tape of cassette 22, and idler pulley 144 maintains the tape against the drive capstan 58. Simultaneously, upward movement of control lever 164 actuates microswitch 176 which applies energizing voltage to capstan drive 108 and, with rotary motion transmitted through rubber drive belt 112 to drive pulley 114, rotation is imparted to capstan 58 to cause cassette tape movement.

The tape supply reel of cassette 22 is energized by application of voltage to motor 94 driving supply drive pulley 86 and drive spur 56. Depression of the REWIND push button 50 energizes motor 94 such that tape may be re-wound back onto the supply reel of cassette 24. Push button 44, the FAST FORWARD control energizes the take-up motor 78, belt pulley 72 and take-up drive pulley 68 to drive spur 54 such that rapid tape wind-up in the forward direction is effected. Push buttons 44 and 50, as shown in FIGS. 6 are merely hold-down push button actuators which serve to short integral contacts affixed to printed circuit board 62 thereby to energize the associated circuitry for carrying out their respective functions. The button 46 is the rotational button for VOLUME control and is interactive through lead 238 with a trim-pot type of potentiometer 234, also integrally formed with the printed circuit board 62.

The RESTART push button 48 is another push button contacting array which serves an electronic function characteristic of the present invention when utilized with teaching machines. RESTART push button 48 can be depressed to provide for restarting the tape in the play mode after it has stopped in response to a control signal. The push button 52 is utilized to actuate lever 244 for movement in the inward direction to actuate a four-pole, two-position switch 250 which serves to make the necessary electronic interconnections for causing a tape repeat, i.e. a rapid reversal of the tape back onto the supply reel of cassette 24 for a predetermined distance of time-length. After a REPEAT operation, the tape resumes it's progression in the forward direction or the normal playback condition. The actual electronics and control of the tape transport device 10 constitute no part of the present invention and, therefore, are not specifically shown in other than a real location planning as indicated by dash-lines 64 (FIG. 3).

The particular receptacles 30, 32, 34 and 36 are specifically adapted for usage in system applications wherein tape transport 10 is operated as a teaching machine. In these conditions, one or more student operated tape transports 10 must be controlled in interconnection to a central or teaching unit which consists of a modified form of tape transport 10 also having recording and interrogation capabilities. A suitable form of central control unit is disclosed in detail in U.S. Patent application Ser. No. 128,302 entitled "Audio Tutoring Device Including Recording Capability" filed on Mar. 26, 1971 by the same inventors. Thus, receptacles 30–36 may be utilized for interconnection of such functions as "phone-microphone" connection, "remote control" connection, connection to auxiliary devices for associated visual display, etc. The number and keying array of pin connections in receptacles 30–36 constitute no part of the present invention.

The unique design principles of the invention enable great economy of construction. The printed circuit board 62 may be pre-assembled to include the photoetched conductor array in permanent affixure and electrical contact with circuit components, receptacles 30–36, jack 38 and switch 40, as well as permanent connection to push button support 212 and the various coactive electrical elements formed integrally with the circuit board, and the dry cell contacting elements. Final assembly then merely entails the securing of chassis 60 on circuit board 62 and placement and fastening of the cover panel 12 over the entire assembly.

The foregoing teaches a novel tape transport mechanism for playback and/or recording of magnetic tape records as contained in standard tape cassettes, the improvements in transport design being such that the device of the invention enables tape movement with greater precision as to speed control and constant tape speed. Such improved reliability and operation is rendered notwithstanding the fact that the mechanism is constructed utilizing design and assembly principles which render the device more easily manufactured at considerable savings in expense.

While the device of the invention has been illustrated as constructed for its use in teaching systems, it should be understood that the basic tape drive and control assemblies may be readily utilized in any of the various cassette playback and recording devices presently finding commercial acceptance. Further, the essential design characteristics should not be particularly limited to cassette tape transports since the similar drive system and construction techniques can be readily applied to tape cartridge transports and even tape reel transports where the design considerations are compatible with the function and requirements of the particular device.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. Tape transport apparatus for playback or recording of magnetic records, comprising:

record supply means including drive means and record reel for supplying said magnetic record to a fixed position;

record take-up means including drive means and take-up reel for receiving said magnetic record from said fixed position onto said take-up reel;

control bar means pivotally secured adjacent to said fixed position and being vertically arcuately movable about a horizontal pivotal axis;

a transducer head affixed on said control bar means adjacent said fixed position;

an idler pulley spring-mounted on said control bar adjacent to said fixed position, said spring exerting tension toward said fixed position;

mechanically actuated control means including a lever assembly for actuation to contact said control bar means and to urge the control bar means in its vertically arcuate direction to bring said transducing head and idler pulley into engagement with said magnetic record at said fixed position;

capstan means including drive means, said capstan means being disposed adjacent to said fixed position in contact with said magnetic record as urged by said idler pulley when said control bar means is actuated to its vertically arcuate upward position.

2. Tape transport apparatus as set forth in claim 1 wherein each of said record supply drive means, record take-up drive means, and capstan drive means include a separate d-c electrical motor.

3. Tape transport apparatus as set forth in claim 1 wherein said control bar means comprises:

a control bar supporting said transducing head and idler pulley adjacent to said fixed position;

end block means secured to each end of said control bar, each end block means extending a pivoting stub portion in common direction; and first and second mounting block means each securely supported on opposite sides of said tape transport, and each being pivotally affixed to a respective one of said end block means pivoting stub portions.

4. Tape transport apparatus as set forth in claim 1 wherein said transducing head is a magnetic tape reproducing head.

5. Tape transport apparatus as set forth in claim 4 which is further characterized to include:

magnetic recording head means secured on said control bar means adjacent to said reproducing head.

6. Tape transport apparatus as set forth in claim 1 wherein said mechanically actuated control means comprises:

manual push button actuation means;

lever means having one end contacting said push button control bar means and a generally central point which is pivotally affixed, such that depression of said lever means one end by said push button actuation means effects movement of said lever means other end to urge said control bar means through said vertical arcuate movement; and means for releasably locking said manual push button means in the depressed position.

7. Tape transport apparatus as set forth in claim 6 which is further characterized to include:

electrical switch means disposed adjacent to said lever means to be actuated closed upon movement of said lever means other end in response to depression of said lever means one end to enable energization of said capstan drive means.

8. Tape transport apparatus as set forth in claim 6 which is further characterized to include:

chassis means supporting each of said record supply means, record take-up means, control bar means and capstan drive means;

a printed circuit board affixed to provide operational circuit conductors as well as underclosure of said chassis means, said printed circuit board including a portion extending out past the perimeter of said chassis means which has secured thereon plural groups of operational control circuit connections; and support means secured on said printed circuit board portion and including a plurality of manipulatable control buttons each captively retained in said support means and each being in operative coaction with a respective one of said plural groups of control circuit connections to effect shorting of said control circuit connections upon manipulation.

9. Tape transport apparatus as set forth in claim 8 which is further characterized in that:

at least one of said control circuit connections consists of a first circuit contact adjacent to a second circuit contact having a leaf spring contacting element affixed thereto, said first and second contacts being disposed such that depression of the coacting control button closes said leaf spring contacting element to said first circuit contact.

10. In a tape transport apparatus having means adapted to pass a magnetic tape by a fixed position to permit engagement of the tape with a transducer head, the improvement which comprises:

a control bar pivotally mounted to permit vertical arcuate movement thereof about a horizontal axis;

a trausducer head mounted on said control bar, said transducer head being positionable adjacent said fixed position by vertical pivotal movement of the control bar; and means for vertically pivotally moving said control bar about the horizontal axis to permit movement of the transducer head between a first position adjacent said fixed position and a second position removed from said fixed position.

11. The apparatus of claim 10 wherein said tape transport apparatus includes a capstan and drive means for the capstan, the capstan being positioned in proximity to said fixed position to drive said tape past said fixed position, and said improvement includes:

an idler assembly mounted on said control bar and positioned thereon to register with the capstan when said transducer head is in said first position.

* * * * *